US012789410B2

(12) United States Patent
Kuznetcov

(10) Patent No.: US 12,789,410 B2
(45) Date of Patent: Nov. 10, 2026

(54) METHOD FOR PRODUCING BUILDING COMPONENTS WITH A CONCRETE LAYER

(71) Applicant: ADDRESS ROBOTICS LIMITED, UK, London (GB)

(72) Inventor: Kirill Kuznetcov, Belgrade (RS)

(73) Assignee: ADDRESS ROBOTICS LIMITED, UK, London (GB)

( * ) Notice: Subject to any disclaimer, the term of this patent is extended or adjusted under 35 U.S.C. 154(b) by 0 days.

(21) Appl. No.: 19/055,045

(22) Filed: Feb. 17, 2025

(65) Prior Publication Data

US 2026/0241609 A1 Aug. 20, 2026

(51) Int. Cl.

| | |
|---|---|
| ***B28B 19/00*** | (2006.01) |
| ***B28B 11/04*** | (2006.01) |
| ***B28B 23/02*** | (2006.01) |
| ***E04B 1/04*** | (2006.01) |

(52) U.S. Cl.

CPC .......... *B28B 19/0015* (2013.01); *B28B 11/04* (2013.01); *B28B 23/02* (2013.01); *E04B 1/04* (2013.01)

(58) Field of Classification Search

None

See application file for complete search history.

(56) References Cited

U.S. PATENT DOCUMENTS

| | | | | |
|---|---|---|---|---|
| 6,176,920 | B1 * | 1/2001 | Murphy | B32B 13/12 106/676 |
| 2015/0125684 | A1 * | 5/2015 | Ando | C08G 65/336 428/220 |
| 2017/0283319 | A1 * | 10/2017 | Maslehuddin | C04B 28/10 |
| 2018/0142475 | A1 * | 5/2018 | Mullaney | E04C 5/201 |
| 2022/0347804 | A1 * | 11/2022 | Baaj | B23P 17/04 |
| 2024/0043331 | A1 * | 2/2024 | Narayan | C04B 14/28 |
| 2024/0151050 | A1 * | 5/2024 | Mehlomakulu | B28B 1/001 |
| 2024/0308914 | A1 * | 9/2024 | Cotter | C04B 40/0042 |

FOREIGN PATENT DOCUMENTS

| | | | | |
|---|---|---|---|---|
| KR | 101860299 B1 * | 5/2018 | | E04G 11/38 |

* cited by examiner

*Primary Examiner* — Abbas Rashid
*Assistant Examiner* — Caroline Beha
(74) *Attorney, Agent, or Firm* — ASLAN LAW, P.C.

(57) ABSTRACT

The proposed invention can be applied in construction for the creation of panels with a concrete layer. The proposed invention enables the formation of permanent formwork (frame) for a base of any shape, reducing the number of operations, increasing manufacturing accuracy, and allowing the creation of complex shapes without increasing time and labor costs. A method for creating a panel with a concrete layer comprises applying at least one layer of concrete mixture to the base using an automated extrusion process; placing reinforcement into the frame before the concrete mixture forming the frame has hardened; applying at least one additional layer of concrete mixture to the frame; pouring concrete mixture into the internal space enclosed by the frame; curing the panel until it reaches the required strength. A panel produced by the proposed method.

17 Claims, 2 Drawing Sheets

METHOD FOR PRODUCING BUILDING COMPONENTS WITH A CONCRETE LAYER

FIELD OF APPLICATION

The proposed invention can be applied in construction to create panels with a concrete layer, which will be used for erecting residential, commercial, and industrial buildings, including load-bearing walls, inter-floor slabs, façade panels, and decorative finishing elements.

PRIOR ART

Known methods for manufacturing frames require the use of wooden or metal structures assembled and installed manually. Moreover, these structures often need to be dismantled after pouring concrete.

The disadvantages of such methods include: high labor and time costs for assembling and dismantling frames; the need to transport bulky frame elements to the construction site; limited possibilities for creating complex geometric shapes, especially when forming a concrete layer with a non-rectangular shape; the inability to integrate frames into the final product, leading to additional expenses for removing and reusing materials; and the high complexity of fully automating the production process of panels with a non-standard concrete layer.

In known analogs where reinforcement is placed in a pre-prepared frame, the reinforcement must match the shape of the frame, which limits design freedom, and there is also a requirement to align the reinforcement within the finished frame, increasing the number of operations and slowing down production.

The proposed method solves these problems by forming non-removable formwork (hereinafter "frame") for a base of any shape, thereby reducing the number of operations, improving manufacturing accuracy, and enabling the creation of complex shapes without increasing time and labor costs. It can be used to create exterior facade panels, load-bearing or non-load-bearing walls, decorative elements, composite floor slabs, etc.

SUMMARY OF THE INVENTION

A method for creating a panel with a concrete layer, comprising: applying at least one layer of waterproofing material to the base; applying at least one layer of concrete mixture to the base using an automated extrusion process to form a frame with a predefined geometry, wherein the frame functions as non-removable formwork; placing reinforcement into the frame before the concrete mixture forming the frame has hardened, wherein at least a portion of the reinforcement is partially embedded in the uncured portion of the frame; applying at least one additional layer of concrete mixture to the frame; pouring concrete mixture into the internal space enclosed by the frame; curing the panel until it reaches the required strength.

In some embodiments, the concrete mixture forming the frame includes one or more additives selected from plasticizers, adhesion promoters, or accelerators to improve flow and bonding with the base. In some embodiments, further comprising partially embedding at least a portion of the reinforcement in an uncured layer of the perimeter frame before applying the subsequent layer of the concrete mixture, thereby enhancing adhesion between the reinforcement and the frame. In some embodiments, at least a portion of the reinforcement is placed on the support element and the support element is mechanically fastened to the base. In some embodiments, the reinforcement is placed above the base in at least two layers. In some embodiments, the concrete mixture used to form the frame has a slump range of 30-200 mm. In some embodiments, the reinforcement includes at least one region that protrudes beyond an edge of the panel, facilitating inter-panel connections or attachment to adjacent structures.

Another method for creating a panel with a concrete layer, comprising: applying at least one layer of waterproofing material to the base; applying at least one layer of concrete mixture to the base using an automated extrusion process to form a frame with a predefined geometry, wherein the frame functions as non-removable formwork; placing at least one support element on the surface of the base; placing reinforcement into the frame before the concrete mixture forming the frame has hardened, wherein the reinforcement is positioned so that it rests on at least one support element; attaching the reinforcement to the base by fixing at least one clamping bracket over the reinforcement so that the clamping bracket presses the reinforcement against the support element, wherein the clamping bracket is secured to the base using at least one fastener; applying at least one additional layer of concrete mixture to the frame; pouring concrete mixture into the internal space enclosed by the frame; curing the panel until it reaches the required strength.

A panel produced by the proposed method, comprising: a base made of wooden, composite, or metal material; a waterproofing layer on the surface of the base; a frame formed by the layer-by-layer application of a concrete mixture; a concrete layer applied to the surface of the base; reinforcement placed within the concrete layer. In some embodiments, the reinforcement includes at least one region that protrudes beyond an edge of the panel, facilitating inter-panel connections or attachment to adjacent structures. In some embodiments, each support element is mechanically fastened to the base using screws, bolts, or anchors.

In some embodiments, the concrete mixture forming the frame includes one or more additives selected from plasticizers, adhesion promoters, or accelerators to improve flow and bonding with the base. In some embodiments, the method comprises partially embedding at least a portion of the reinforcement in an uncured layer of the perimeter frame before applying the subsequent layer of the concrete mixture, thereby enhancing adhesion between the reinforcement and the frame. In some embodiments, at least a portion of the reinforcement is placed on the support element and the support element is mechanically fastened to the base. In some embodiments, the reinforcement is placed above the base in at least two layers. In some embodiments, the concrete mixture used to form the frame has a slump range of 30-200 mm. In some embodiments, the reinforcement includes at least one region that protrudes beyond an edge of the panel, facilitating inter-panel connections or attachment to adjacent structures. In some embodiments, each support element is mechanically fastened to the base using screws, bolts, or anchors.

DETAILED DESCRIPTION OF THE INVENTION

Figure 1:
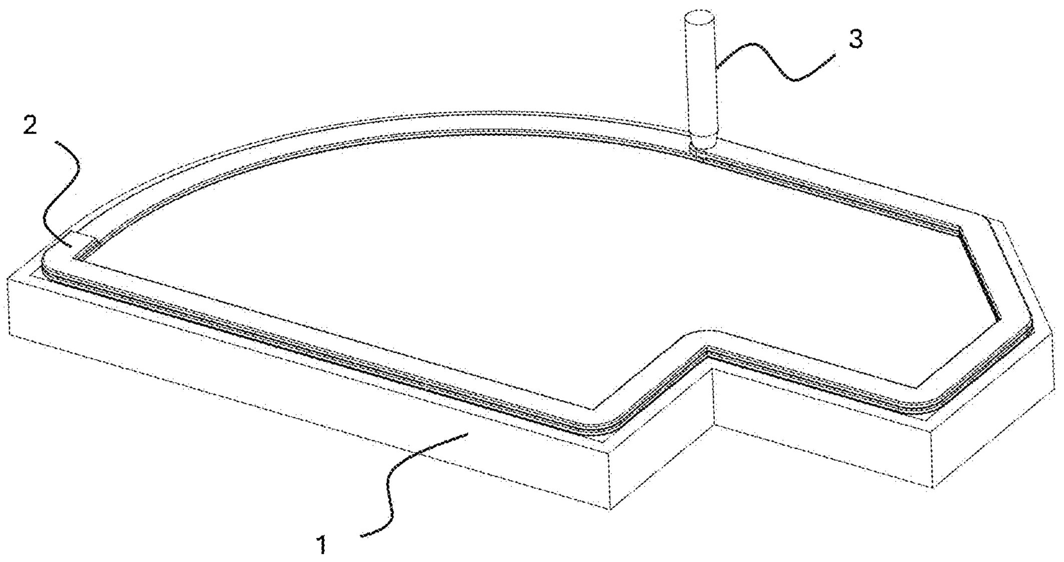
FIG. 1 illustrates an example of forming a concrete frame (2) along the perimeter of the base (1), with the nozzle (3) depositing successive layers of the concrete mixture.

Panels with a concrete layer consist of a base, a concrete layer, and reinforcement placed within the concrete layer. To produce such panels, the concrete mixture must be placed on the base in such a way that it is fixed relative to the base.

Typically, the concrete mixture is applied to the base in a liquid form, so that it evenly covers the base; in this case, it is required that the concrete mixture not flow beyond the edges of the base and retain the required shape until it hardens.

A metal, plastic, wooden, or composite panel can be used as the base, including one made of multiple layers of solid lumber glued together. For example, this could be a CLT (cross-laminated timber) panel or a GLT (Glued-Laminated Timber) panel.

In some embodiments, during subsequent steps, the base is placed on a horizontal surface.

An example of implementing the invention is shown in FIGS. 1-4. The figures illustrate: the base (foundation layer) (1), the frame (2), the nozzle (3), the reinforcement (4), the protruding reinforcement (5), the support element (6), the clamping bracket (7), and the fastener (8).

Step 001: Application of a Waterproofing Layer

A waterproofing layer is applied to the surface of the base to protect the material from moisture.

If a waterproofing layer is not applied, this may lead to wood swelling, base deformation, loss of strength, and cracking. Such changes can disrupt adhesion between layers, resulting in the delamination of the concrete coating and a reduction in the durability of the structure.

In some embodiments, the waterproofing layer can be applied using a brush, roller, or spray can.

In some embodiments, liquid sealants, waterproof paints, or other specialized coatings may be used.

In some embodiments, bituminous mastics or membrane coatings providing enhanced water resistance may be used for waterproofing.

In some embodiments, a base with a pre-applied waterproofing layer may be used.

In some embodiments, the adhesion of the concrete layer to the base can be enhanced by additional methods, such as: applying adhesion primers (e.g., epoxy or polyurethane) before placing the concrete, using a roughened surface on the base (e.g., creating grooves on a wooden or composite panel), introducing fiber reinforcement into the concrete mixture to improve bonding with the base.

Steps 002-005 are carried out on the side of the base where the waterproofing layer has been applied.

Step 002: Formation of the Frame

A concrete mixture is applied layer-by-layer along the perimeter of the base to form a frame, which will prevent the concrete layer from flowing beyond the base during its application. The layer-by-layer application of the concrete mixture is directly deposited onto the waterproofed base and contiguously bonded to said base to form the permanent frame.

For this purpose, the concrete mixture is applied layer by layer, creating a closed contour structure that serves as permanent formwork. The concrete mixture is applied in layers and can be applied in a single or multiple layers. The frame is directly attached (bonded) to the base, eliminating the need for creating a separate outer shell that is later filled.

The frame acts as a mold for the subsequent pouring of the concrete mixture, ensuring the precise geometric parameters of the product, improving assembly accuracy, and reducing material waste. Therefore, the frame has a closed contour.

FIG. 1 illustrates an example of the invention's implementation, in which several layers of a concrete mixture are applied to the base (1) using an extruder through a nozzle (3), forming the frame (2).

The frame can be positioned either at the very edge of the base or slightly away from it, depending on the requirements of the final product and the intended construction method.

The frame material is preferably a concrete mixture, which may include additives such as adhesion improvers, setting accelerators, viscosity enhancers, and others. At a minimum, the concrete mixture consists of cement and water, but it may also contain fillers such as sand, gravel, and other additives.

In some embodiments, the concrete mixture may include: plasticizers (e.g., polycarboxylate-based superplasticizers) to improve workability, setting retarders (e.g., lignosulfonates) to ensure smooth layer-by-layer application, hardening accelerators (e.g., calcium chloride or silicates) for faster strength gain, thickening additives (e.g., microsilica or latex emulsions) to improve shape retention of the frame after application.

In some embodiments, the frame is formed along the perimeter of the panel, ensuring a specified geometry and height.

In some embodiments, the frame may be formed at a slight distance from the edge of the panel, ensuring the desired geometry and height. This approach is applicable, for example, when the reinforcement placed inside the concrete layer is intended to protrude beyond the frame. This option can be used for buildings assembled from such panels.

In some embodiments, the protruding parts of the reinforcement of adjacent panels may be fixed together to enhance the structural integrity of the connection, for example, using wire, polymer ties, clamps, brackets, or welding.

In some embodiments, the space between the external edges of the frames of two adjacent panels will be filled to ensure a reliable connection. In some embodiments, this space may be filled with a concrete mixture and/or other materials, such as insulating materials.

The concrete mixture is applied in a dense state to form permanent formwork. Full drying of the concrete mixture before proceeding to the next step is not required, which increases adhesion and fixation of the reinforcement within the frame due to its encapsulation in the uncured concrete. Additionally, vibration is not necessary at this stage, and a single application of vibratory compaction at the final stage is sufficient.

In some embodiments, the concrete mixture does not spread and fully or partially retains its shape after application.

In some embodiments, the concrete mixture spreads, but only to an extent sufficient to maintain the overall shape of the frame.

The formation of the frame using the described method requires the use of a concrete mixture with properties ensuring shape retention, adhesion between layers, and bonding with reinforcement. For this, the mixture must have sufficient viscosity to prevent spreading after application while maintaining enough plasticity to ensure uniform application.

Therefore, the acceptable slump range (Slump Test) for the concrete mixture used to form the frame is 30-200 mm. The optimal range of 30-100 mm ensures shape retention without significant spreading, making the mixture suitable for layer-by-layer application, and allowing vibration compaction at any stage of the process. When using a concrete mixture with a slump of 101-200 mm, some spreading is possible; however, the mixture still retains sufficient shape to maintain the frame structure.

Additionally, the choice of concrete mixture consistency depends on the number of layers planned for application. The fewer layers required, the less viscous the mixture can be, as a smaller number of layers reduces the risk of deformation due to the mixture's self-weight. In such cases, a slump closer to the upper range can be used, simplifying the application process and improving form fillability. However, for multi-layer application, a thicker mixture is preferred to ensure the stability of each layer before applying the next one.

In some embodiments, the concrete mixture is applied in the form of elongated beads, similar to strips formed during 3D printing. In this case, the shape of the extrusion stream is not critical and may have different cross-sectional profiles, such as round, oval, square, or rectangular with rounded corners. The preferred shape is rectangular with rounded corners, as it provides a more convenient surface for placing subsequent layers of the concrete mixture.

The thickness of the frame layer, the number of layers, and the frame width depend on the size of the base and the required thickness of the concrete layer to be applied to the base.

The thickness of the concrete layer covering the base depends on structural strength requirements and the intended use of the panel. The thickness may vary depending on expected loads, climatic conditions, and the need for fire resistance.

In some embodiments, the concrete mixture is applied in multiple layers, ensuring that the width of the frame does not exceed its height. This approach maintains the stability of the frame, preventing deformation during subsequent concrete pouring and avoiding excessive material consumption. If the frame width exceeds its height, unnecessary material consumption will occur.

The concrete layers forming the frame can be applied using any known method that allows for control of deposition speed and volume, such as: a robotic manipulator equipped with a pump, metering system, and nozzle for uniform concrete mixture application; other suitable tools or equipment.

The preferred method is the use of extrusion devices that deposit material through a shaping nozzle, ensuring a continuous flow of a specific shape.

In some embodiments, an extruder for layer-by-layer concrete deposition is used, designed for automated material application, enabling the formation of structures without using traditional formwork.

The extruder operates as follows: the concrete mixture is loaded into a hopper and fed into the extrusion system; a pump or screw mechanism creates pressure to advance the material through the pressurization chamber; the pressurization chamber maintains consistent pressure for stable material delivery; a filter or agitator prevents clogging and ensures uniform mixture consistency; the concrete is directed into a nozzle, shaping the flow and guiding it to the application area; a control system regulates the feed rate, pressure, and extrusion path, ensuring precise layer-by-layer deposition and the ability to create complex geometric forms.

The use of extrusion technology makes the application process more controlled, allowing for accurate deposition of concrete layers.

In some embodiments, a robotic 3D printer is used, applying the concrete mixture layer by layer, controlled by a numerical control system (CNC).

To ensure uniform application of the concrete mixture forming the frame, it is advisable to consider: the nozzle shape—preferably rectangular or oval for even layer formation; the nozzle width—selected based on the required layer thickness, usually more than 10 mm; the diameter of the nozzle opening—should balance feed rate and deposition accuracy, typically greater than 10 mm; the presence of a pressure regulation system-allows stable material flow.

In some embodiments, layer deposition control is carried out using: laser or ultrasonic sensors mounted on the extruder manipulator to measure layer height; a CNC system that adjusts the extruder trajectory.

The interval between layer applications depends on temperature and humidity at the processing site, as well as on the concrete mixture additives used (retarders or accelerators). Typically, no more than 30 minutes is required at standard temperature (+20 °C) to allow the lower layer to set sufficiently to support the next one while remaining moist enough for strong adhesion.

In some embodiments, for frames taller than 0.5 m, additional reinforcement may be introduced within the vertical walls of the frame, embedding horizontal and/or vertical reinforcement rods into the layers during frame formation.

Step 003: Reinforcement Placement

The reinforcement is placed or partially embedded in the uncured concrete layers of the frame. In some embodiments, the reinforcement is placed on the surface of the base, on top of the frame, formed by the concrete mixture. The concrete frame holds the reinforcement in place, eliminating the need for additional fasteners to secure the reinforcement, thereby reducing the number of operations.

The reinforcement increases the strength and rigidity of the concrete layer, prevents cracking, and ensures the connection between the concrete and wooden layers, improving the overall structural stability.

Figure 2:
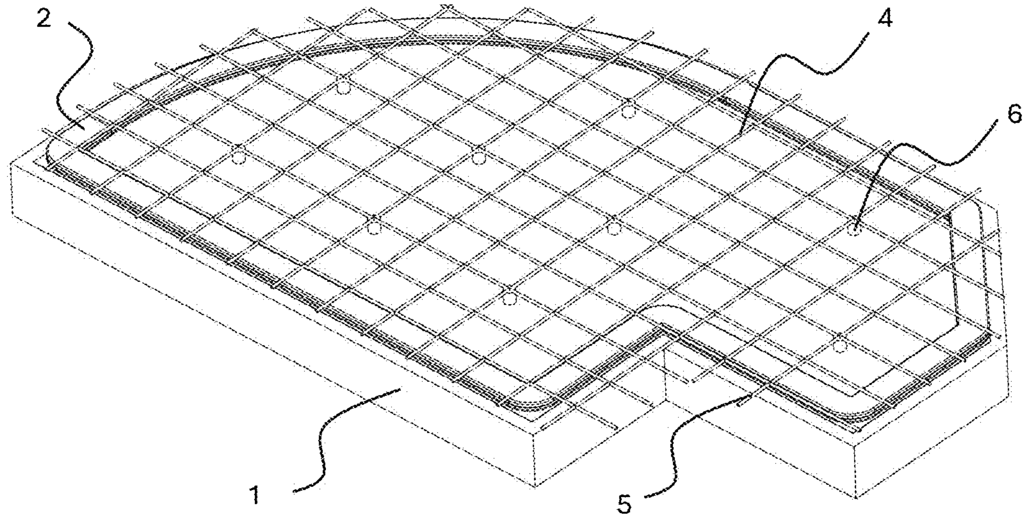
FIG. 2 shows the placement of reinforcement (4) on a support element (6) within the partially formed frame (2), as well as protruding reinforcement (5) that extends beyond the frame's edge.

FIG. 2 illustrates an example of the invention, in which the reinforcement (4) is placed on the support element (6) and the frame (2) above the base (1), as well as the protruding reinforcement (5).

In some embodiments, the reinforcement may be fully or partially embedded in the already applied layers of the concrete mixture forming the frame. This ensures increased strength and stability of the structure by enhancing the adhesion of the reinforcement to the concrete mixture. It also allows for an even distribution of loads within the panel, minimizing the risk of concrete cracking and improving the durability of the product. The reinforcement will gradually sink into the concrete mixture of the frame under its own weight.

Additionally, partially embedded reinforcement simplifies the assembly of multilayer structures, as new layers of reinforcement can be fixed to previously laid layers, providing additional connection strength.

In some embodiments, the reinforcement may be in the form of individual rods or interconnected rods forming a reinforcement mesh.

In some embodiments, the reinforcement may be made of metal or composite rods, fiberglass, or other materials with similar properties. The material of the reinforcement rods, their thickness, and the spacing of the rods can be selected based on the structural strength requirements of the panel, the size and shape of the product, as well as the expected loads and operating conditions.

The reinforcement is intended to enhance the strength and rigidity of the concrete layer, prevent cracking, and ensure the connection between the base and the concrete layer.

In some embodiments, the reinforcement may be arranged so that it has protruding reinforcement extending beyond the edges of the panel, for example, on at least two adjacent sides, for subsequent connection with neighboring panels.

In some embodiments, the reinforcement is secured to the surface of the base or at a required height above the base using clamping brackets (7), such as staples, and fasteners (8). This provides additional fixation of the reinforcement relative to the base and ensures the strength of the final product.

In some embodiments, support elements (6) may be used to position the reinforcement at a specific height above the base surface and prevent it from sinking excessively into the frame. In this case, before placing the reinforcement above the base, the support elements (6) are positioned on the base surface.

Support elements may have various shapes, such as cylindrical, parallelepiped, inverted U-shape, or other forms that allow the reinforcement to be stably positioned on the support element. The support elements are placed in such a way as to ensure the reinforcement is positioned at a predetermined height above the base.

Support elements can be made of metal, plastic, composite material, wood, or other dense materials.

The panel may include one or multiple layers of reinforcement, but at least one layer must be present.

In some embodiments, when placing the second and subsequent layers of reinforcement, the support element may be positioned either between the base and the reinforcement layer being installed or between the previous reinforcement layer and the one being installed.

In some embodiments, the reinforcement rests on the support elements.

Figure 4:
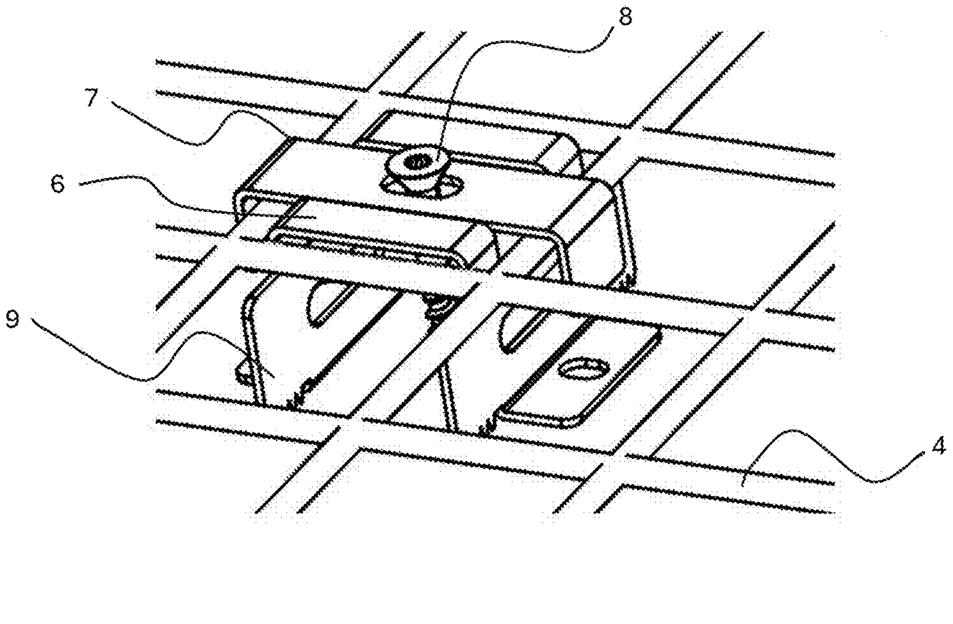
FIG. 4 illustrates an enlarged view of the support element (6) and clamping bracket (7), which are secured to the base (1) by at least one fastener (8) to hold the reinforcement (4) at a specified height above the base.

In some embodiments, the reinforcement is secured relative to the base by clamping brackets placed over the support elements and fastened with fasteners (FIG. 4). The fasteners pass through both the support element and the clamping bracket and are anchored in the base, securing the reinforcement in place.

In some embodiments, holes for fasteners may be premade in the base before the reinforcement is secured.

Various fasteners, such as self-tapping screws, anchor bolts, wedge anchors, or expansion nails, may be used to ensure a reliable fixation of the reinforcement relative to the base.

Clamping brackets are preferably made of metal, as they need to be strong enough to provide secure fixation. However, other materials, such as polymers, may also be used.

Fixing the first reinforcement layer to the base ensures that the concrete layer applied in subsequent steps remains securely attached to the base.

The proposed technology also allows for the installation of pre-stressed reinforcement if required by the strength and rigidity calculations of the panel. Since the reinforcement is installed before the concrete is poured, this improves the structural performance, increases its load-bearing capacity, and reduces the risk of cracking by minimizing tensile stresses in the concrete after it hardens.

The method for installing pre-stressed reinforcement involves several sequential steps to create initial tension in the reinforcement elements before pouring the concrete layer.

First, the ends of the reinforcement are fixed to the panel base to prevent displacement during tensioning.

To secure the tensioned reinforcement in a wooden or composite base, the following methods may be used: anchor plates or steel studs pre-installed in the base (e.g., glued with epoxy resin); special embedded metal inserts with holes for anchor clamps; for high-load applications, welded nodes connected to metallic inclusions in the panel, creating a reliable support point for a jack or other tensioning mechanism; after securing the reinforcement ends, its central section is gripped by a robotic manipulator equipped with a gripper that pulls the reinforcement to a specified distance or force level.

Tensioning can be performed using various devices, including hydraulic tension jacks, electromechanical screw systems, or pneumatic tensioners, ensuring smooth regulation of tension.

A control system monitors the force and elongation of the reinforcement during tensioning, ensuring precise compliance with design calculations.

Once tensioned, the reinforcement elements are fixed to the base using: hydraulic locking mechanisms, mechanical stops with automatic locking, or special clamps that stabilize the reinforcement and prevent it from relaxing before the concrete mix fully sets.

Tensioning may be performed in any plane depending on the strength calculations and panel purpose, including: horizontal tensioning for floor slabs, vertical tensioning for wall panels, diagonal tensioning for structures with combined loads.

This method can be implemented in automated assembly lines, where tensioning is performed by a robotic system with a hydraulic manipulator and force control sensors, as well as in stationary setups using hydraulic jacks with mechanical clamps.

An alternative approach involves a mobile robotic tensioner with an electromechanical drive, moving along the panel and tensioning the reinforcement sequentially in each segment, which is particularly effective for prefabricated structures of various sizes.

Since the reinforcement is installed during the formation of the frame, its fixation, positioning, and tensioning occur before concrete pouring, with the concrete layer filling the space after reinforcement placement.

During the layer-by-layer application of the concrete mixture, the frame simultaneously holds the reinforcement in place. As a result, the reinforcement becomes an integral part of the structure during its formation.

This ensures better adhesion between the concrete and reinforcement, as the concrete mixture naturally fills the space around the reinforcement, creating a tighter bond.

Since the reinforcement can be positioned in any orientation before concrete pouring, this allows for adjusting the reinforcement angles according to load requirements. Additionally, multiple levels of reinforcement can be used, increasing the panel's overall strength.

Step 004: Increasing the Height of the Frame by Applying Additional Layers of Concrete Mixture In some embodiments, subsequent layers of the concrete mixture are applied over the frame after placing reinforcement into the frame and forming the frame so that the total height of the frame reaches the required value. If the reinforcement is arranged in multiple layers, applying additional layers of the frame can enhance its rigidity and stability, preventing displacement during concrete pouring. Additionally, forming a multilayer frame allows for the creation of a more rigid and stable shape, reducing the likelihood of deformation. Moreover, with such layer-by-layer application of the concrete mixture for the frame, better adhesion between the layers is ensured, increasing the strength of the final product.

Figure 3:
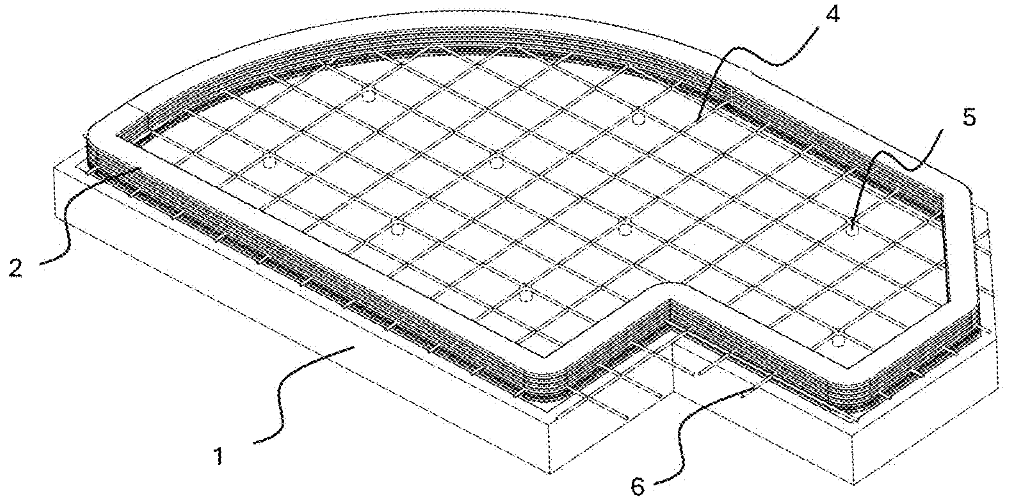
FIG. 3 depicts the application of additional concrete layers on top of the previously formed frame (2) to increase its height, covering the reinforcement (4) and defining the panel's final thickness.

FIG. 3 illustrates an example of the invention, where additional layers of the concrete mixture forming the frame (2) are placed on top of the previously applied layers of the concrete mixture forming the frame and over the reinforcement (4).

The height and width of the frame are selected based on the dimensions of the base and the required characteristics of the finished product.

The height of the frame must be at least equal to half of the thickness of the concrete layer that will cover the base. In this case, the frame will prevent the concrete mixture from spreading beyond the designated area.

Preferably, the width of the frame should not be less than half of its height to ensure sufficient structural strength and resistance to deformation during the formation of both the frame and the concrete layer on the base.

After applying each new layer of concrete to form the frame—or after several such layers—the operation of reinforcement placement described in Step 003 may be repeated.

In some embodiments, new layers of reinforcement are secured either directly to the base, to the support elements of the first reinforcement layer, or to a previously placed reinforcement layer. In this case, support elements may be positioned either between the reinforcement layers or between the reinforcement layer and the base to ensure reinforcement placement at the required height.

In some embodiments, reinforcement may be secured using clamps and fasteners either to the base or to the support elements of one of the preceding reinforcement layers.

If subsequent layers of reinforcement are fixed to previous layers, this fixation can be carried out using other known methods, such as wire, plastic straps, metal clamps, spot welding at the intersection points of rods, or specialized clips and ties for reinforcement. A fixation method may be used that prevents the displacement of one reinforcement layer relative to another during the formation of the concrete layer until it fully hardens, as after hardening, the entire reinforcement structure will be secured within the concrete layer.

Step 005: Filling the Space on the Base Surface, Enclosed by the Frame, with Concrete Mixture The internal space of the base, enclosed by the frame, is filled with a concrete mixture. The pouring process is carried out using known tools and equipment. It is preferable to calculate the amount of concrete so that the concrete level after pouring aligns with the top of the frame, preventing overflow.

The concrete mixture can be selected with any parameters depending on the requirements of the finished product.

The concrete mixture may include additives, such as adhesion enhancers, setting accelerators, viscosity enhancers, and others.

Vibrational loading is used during pouring to remove air bubbles and ensure uniform distribution of the mixture. Vibration can be applied using immersion vibrators, which are directly inserted into the concrete mixture, or surface vibrators that act on the edges of the base. Additionally, vibrating platforms may be used to provide uniform oscillations throughout the entire structure.

After pouring, the panel is left to dry until it reaches the required strength. Due to the use of a concrete pouring method, the surface of the slab remains smooth after drying and does not require additional finishing. Preferably, drying is conducted until the concrete achieves at least 70% of its design strength. The concrete mixture reaches approximately 70% of its design strength within 7 days under normal curing conditions (t=20° C., humidity 95%). At this stage, its moisture content is still relatively high, but its mechanical strength is sufficient to allow the slabs to be moved.

The drying process ensures the final formation of the concrete structure and its mechanical properties.

If necessary, additives and hardening accelerators may be used to speed up the process.

The optimal concrete mixture consistency for filling the space formed by the frame in the first embodiment of the invention corresponds to a slump range of 50-150 mm according to the Abrams cone test (Slump Test), with the possibility of increasing it to 200 mm in certain cases, such as when using self-compacting mixtures.

A composite panel can be manufactured using the described method.

The structure of the panel produced using the proposed method includes at least: a base made of a wooden or composite panel, with a waterproofing layer applied to it; a frame, formed by layer-by-layer application of a concrete mixture along the perimeter of the panel; a concrete layer applied to the base inside the frame, over the waterproofing layer; reinforcement placed within the concrete layer.

In some embodiments, the reinforcement may extend beyond the concrete layer.

In some embodiments, the reinforcement may be arranged in one or multiple layers, connected to each other using wire, plastic straps, metal clamps, or welding.

In some embodiments, the reinforcement may be attached to the base using at least one clamping bracket and at least one fastener.

FIG. 4 illustrates an example of the invention, where the reinforcement (4) rests on a support element (6). A single support element may be used for one reinforcement rod, or multiple support elements may support a single reinforcement structure. If the reinforcement rods intersect, it is preferable to position the support element at the intersection points.

In some embodiments, the support element (6) has a clamp body, which may be in the form of a rectangular frame or a U-shaped body, along with legs, and includes at least one fixing hole. The fixing hole may be located on the clamp body, on the legs, or in both locations. In this case, the reinforcement (4) rests on the clamp body, while the legs are positioned against the base (1). The support element (6) can be fixed to the base through the fixing holes using at least one fastener to enhance the reliability of the reinforcement's attachment to the base (1).

The clamping bracket (7) is larger than the support element (6) and is placed over the support element (6) and the reinforcement (4) to secure at least one reinforcement rod (4) between the support element (6) and the clamping bracket (7).

In some embodiments, the clamp body of the support element (6) has protruding sections (9) on which the reinforcement (4) rests, as shown in FIG. 4. This design optimizes material usage for the production of the support element (6).

The clamping bracket (7) has at least one fixing hole, through which it is secured to the base (1) using a fastener.

In some embodiments, the clamping bracket may be fixed using: fasteners passing through designated holes in the clamping bracket and anchored into the base; screws or anchors that pass through the clamping bracket, securing it to the base.

A single fastening assembly, consisting of a support element, a clamping bracket, and a fastener, may be used for securing either a single reinforcement rod or multiple rods. If reinforcement rods intersect, it is preferable to place the fastening assembly at the intersection points.

In some embodiments, the concrete layer may include additives to enhance its strength, resistance to external influences, and adhesion to the base.

In some embodiments, the panels may have various geometric shapes, including rectangular, circular, or custom-shaped elements, as well as openings for communication channels or fastening systems.

In some embodiments, the panel may be additionally coated with protective layers that improve its operational properties, such as hydrophobic or fire-resistant coatings.

In some embodiments, a heating or cooling system may be integrated into the concrete layer to create panels with climate control functions.

In some embodiments, channels or openings may be embedded in the concrete layer for housing utility systems such as cables, ventilation ducts, or water supply lines.

The proposed invention enables the production of panels of any shape, including round or irregular shapes with internal openings of any configuration. The described frame formation method allows for the creation of even the most complex geometric elements.

The proposed invention not only reduces the time required to manufacture concrete-layered panels but also enables the full automation of the production process for panels of any shape. This is achieved by eliminating the need to fabricate, install, and later dismantle removable formwork. Time and resource savings are also ensured by integrating the frame as part of the structure, eliminating the need for its removal.

The durability and strength of the final product are ensured by the multilayer construction, consisting of sequentially applied reinforcement and concrete layers. The proposed panel is suitable for use as a wall panel, facade panel, floor panel, or decorative element, due to the permanent integration of the frame with the base.

Ease of transportation is achieved by the ability to supply components in a disassembled state, followed by frame formation and concrete pouring at the installation site.

Scalability is facilitated by the flexibility of the concrete layer application technology and the adaptability of the frame to any dimensions.

The terms and definitions used in this application are provided solely for the purpose of describing the invention and facilitating its understanding. They should not be interpreted in a manner that limits the scope of the claims or restricts the applicant's rights.

The embodiments and examples disclosed in this application are illustrative and non-limiting. Variations, modifications, and equivalents that fall within the spirit and scope of the invention, as defined by the appended claims, are intended to be encompassed therein.

The use of singular terms, such as "a," "an," and "the," should also be interpreted to include plural forms unless explicitly stated otherwise. Similarly, the use of specific terms should not be construed as excluding equivalents that serve the same function or achieve the same result.

The scope of the invention is defined by the claims, and the description should not be used to limit the interpretation of these claims.

The invention claimed is:

1. A method for creating a panel with a concrete layer, comprising: applying at least one layer of waterproofing material to a base comprising a wooden panel or a panel made of multiple layers of solid lumber glued together, wherein the base remains in the finished panel; applying at least one layer of concrete mixture to the base by automated extrusion directly onto the waterproofed base to form a closed-contour perimeter frame along a peripheral edge of the base that is bonded to the base, wherein the frame functions as non-removable formwork; placing reinforcement into the frame before the concrete mixture forming the frame has hardened, wherein at least a portion of the reinforcement is partially embedded in the uncured portion of the frame, and wherein at least one region of the reinforcement protrudes beyond an edge of the formwork to facilitate inter-panel connections or attachment to adjacent structures; applying at least one additional extruded layer of the concrete mixture to increase the height of the perimeter frame to a target value; pouring concrete mixture into the internal space enclosed by the frame to form a concrete layer covering the base; and curing the panel until it reaches a required strength, wherein the resulting panel has predetermined dimensions and the protruding reinforcement is configured for automated inter-panel connection during robotic building assembly, wherein the reinforcement connects the concrete layer to the base so that the base and the cured concrete layer together form a load-bearing composite panel, the concrete layer having a thickness determined by structural strength requirements, and the frame being permanently integrated with the base.

2. The method of claim 1, further comprising applying at least one additional layer of concrete mixture to the frame after placing reinforcement into the frame.

3. The method of claim 1, wherein the concrete mixture forming the frame includes one or more additives selected from plasticizers, adhesion promoters, or accelerators to improve flow and bonding with the base.

4. The method of claim 1, further comprising partially embedding at least a portion of the reinforcement in an uncured layer of the closed-contour perimeter frame before applying the subsequent layer of the concrete mixture.

5. The method of claim 1, wherein at least a portion of the reinforcement is placed on a support element and the support element is mechanically fastened to the base.

6. The method of claim 1, wherein the reinforcement is placed above the base in at least two layers.

7. The method of claim 1, wherein the concrete mixture used to form the frame has a slump range of 30-200 mm.

8. The method of claim 1, wherein the reinforcement includes at least one region that protrudes beyond an edge of the panel, facilitating inter-panel connections or attachment to adjacent structures.

9. The method of claim 1, wherein the height of the frame is equal to half of the thickness of the concrete layer that covers the base or higher than half of the thickness of the concrete layer that covers the base.

10. A method for creating a prefabricated panel with a concrete layer, comprising: applying at least one layer of waterproofing material to a base panel comprising a wooden panel or a panel made of multiple layers of solid lumber glued together, wherein the base remains in the finished prefabricated panel; applying at least one layer of concrete mixture to the base by automated extrusion directly onto the waterproofed base to form a closed-contour perimeter frame along a peripheral edge of the base panel that is bonded to the base with a predefined geometry, wherein the frame functions as non-removable formwork;

placing at least one support element on the surface of the base panel, the support element including a clamp body with legs and at least one fixing hole; placing reinforcement into the frame before the concrete mixture forming the frame has hardened, wherein the reinforcement is positioned so that it rests on the clamp body of the support element; placing a clamping bracket over the reinforcement and the support element, the clamping bracket having at least one fixing hole and being larger than the support element, and securing the reinforcement to the base by passing at least one fastener through the clamping bracket fixing hole and through the support element fixing hole to anchor into the base, whereby the clamping bracket presses the reinforcement against the support element; applying at least one additional layer of concrete mixture to the frame; pouring concrete mixture into the internal space enclosed by the frame to form a concrete layer covering the base; and curing the panel until it reaches a required strength, wherein the reinforcement connects the concrete layer to the base panel so that the base panel and the cured concrete layer together form a load-bearing composite prefabricated panel, the concrete layer having a thickness determined by structural strength requirements, and the frame being permanently integrated with the base.

11. The method of claim 10, wherein the concrete mixture forming the frame includes one or more additives selected from plasticizers, adhesion promoters, or accelerators to improve flow and bonding with the base.

12. The method of claim 10, further comprising partially embedding at least a portion of the reinforcement in an uncured layer of the perimeter frame before applying the subsequent layer of the concrete mixture.

13. The method of claim 10, wherein at least a portion of the reinforcement is placed on the support element and the support element is mechanically fastened to the base.

14. The method of claim 10, wherein the reinforcement is placed above the base in at least two layers.

15. The method of claim 10, wherein the concrete mixture used to form the frame has a slump range of 30-200 mm.

16. The method of claim 10, wherein the reinforcement includes at least one region that protrudes beyond an edge of the panel, facilitating inter-panel connections or attachment to adjacent structures.

17. The method of claim 10, wherein each support element is mechanically fastened to the base using screws, bolts, or anchors.

* * * * *